July 17, 1928.
O. R. CLOSE ET AL
1,677,814
SAFETY SNAP HOOK
Filed Jan. 23, 1928
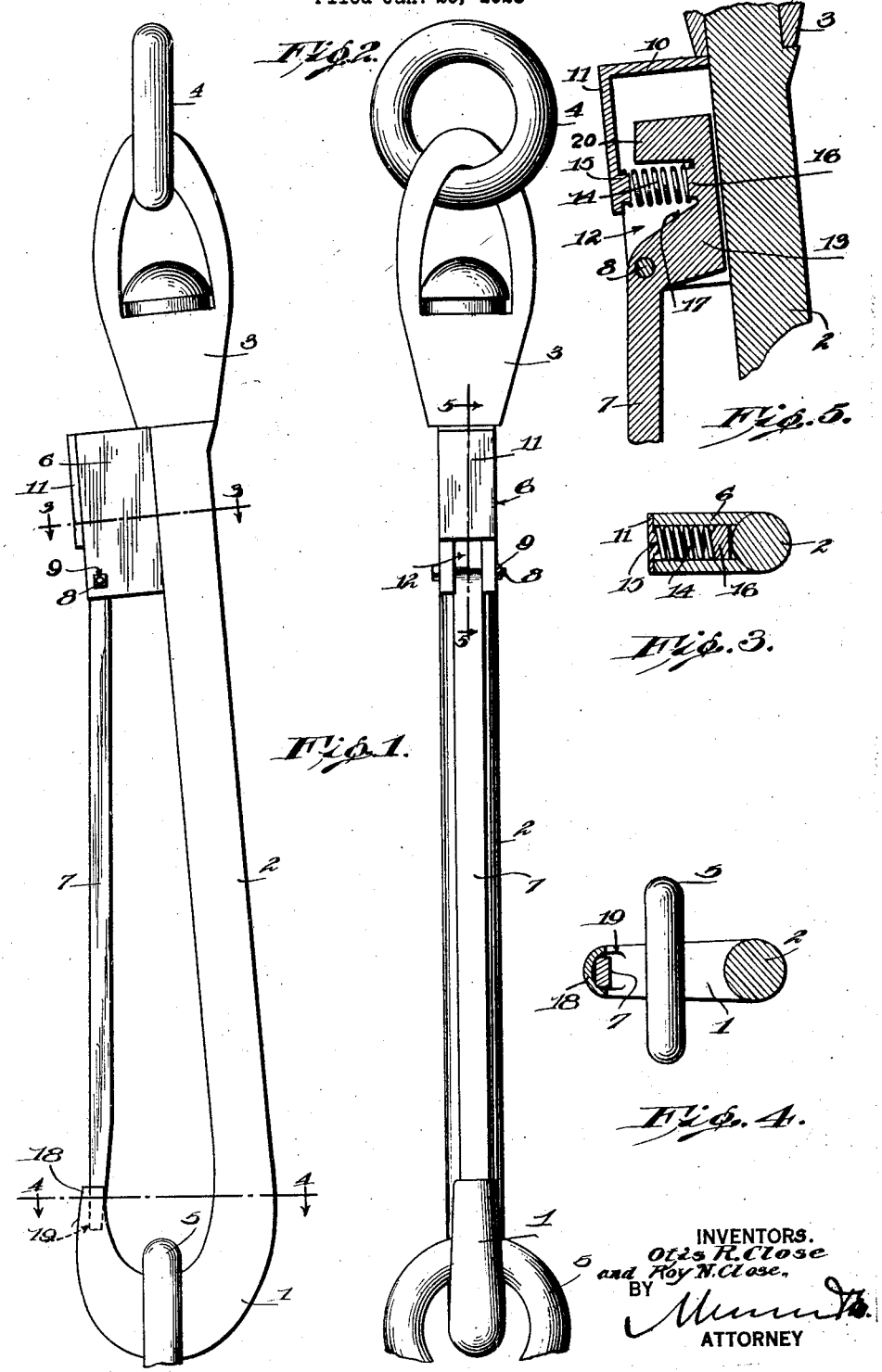
INVENTORS.
Otis R. Close
and Roy N. Close,
BY
ATTORNEY Patented July 17, 1928.

1,677,814

UNITED STATES PATENT OFFICE.

OTIS R. CLOSE AND ROY N. CLOSE, OF CARTERVILLE, MISSOURI.

SAFETY SNAP HOOK.

Application filed January 23, 1928. Serial No. 248,753.

This invention relates to improvements in snap hooks, and it consists of the constructions, combinations and arrangements herein described and claimed.

An object of the invention is to provide a snap hook designed to withstand the hard usage of mine operation, to which end the tongue is designed to permit the instantaneous release of the hook from the bale of a hoisting tub and the application of the hook to the bale of another tub with equal facility.

Another object of the invention is to incorporate in a hook of the character mentioned a particularly advantageous structure in the hook box and tongue heel, the latter including a stop which will limit the swinging movement of the tongue toward the hook shank, a particular merit existing in the protection afforded both to the heel and spring housed by the box.

Other objects and advantages appear in the following specification, reference being had to the accompanying drawing in which, Figure 1 is a side elevation of the improved snap hook, Figure 2 is a front elevation of the hook, Figure 3 is a detail cross section taken on the line 3—3 of Figure 1, Figure 4 is a detail cross section taken on the line 4—4 of Figure 1, Figure 5 is a fragmentary section taken on the line 5—5 of Figure 2.

The snap hook herein described discloses structural features that are particularly designed to meet the exigencies of mine hoists. It is a common custom in mine operation to use a hook on the end of a cable for making a connection of the latter with a tub or bucket. It is quite usual to hoist a load of approximately 2000 pounds over a distance of approximately 250 feet as many as 1200 times in a working day.

The necessity of insuring the attachment of the hook with the bale of the hoisting bucket or tub is obvious. In fact the necessity has become so apparent that divers safety devices have been designed and utilized.

Although the use of safety devices for holding the hook in place upon the bale of the tub is desirable yet any complexity of an adopted safety device will establish the drawback of diminishing the speed with which the hook can be changed from one bale to another, as well as increase the cost of manufacture and maintenance.

All of the foregoing objections have been overcome by providing a hook that is not only simple in construction, but which may be operated with great speed. The hook 1 includes a shank 2 and a swivel 3. Connection of a hoisting cable (not shown) is made at the swivel 3. A ring 4 may desirably be interposed. The bale of a hoisting bucket or tub is indicated at 5.

A box or housing 6 provides a base upon which a tongue 7 is pivotally mounted at 8. The latter is removable by preference. Usually a bolt will be employed. This bolt has a nut 9 on the threaded end, the unscrewing of the nut permitting removal of the bolt and removal of the tongue in the manner presently described.

The sides of the housing 6 support the bolt. The sides are either integral with or appropriately attached to the shank 2 so that the rear of the housing is closed. The top 10 and front 11 provide closures for the upper and front portions of the housing. The front 11 extends down only part of the way. The bottom of the housing is left open, the result of the arrangement being a passageway 12 by which the heel 13 of the tongue 7 and the spring 14 are inserted.

Lugs 15 and 16 on the front 11 and heel 13 respectively provide retainers for the springs. The lug 16 is situated at the base of a recess 17 in the heel. That wall of the recess nearest to the bolt 8 is sloping. The purpose of the slope is to form a guide and to facilitate the insertion of the spring 14 after the tongue has been hung in place within the housing by means of the bolt 8. That portion of the heel 13 opposite to the slope 17 provides a stop 20 which is engageable with the front 11. This feature has two distinct advantages; undue compression of the spring 14 is prevented, and the movement of the tongue 7 toward the shank 2 is limited.

In order that the interior walls of the hook 1 and tongue 7 may be practically uninterrupted the nose 18 is recessed at 19 to admit the free extremity of the tongue. The recess is preferably formed by rounding the nose as shown in Figure 4.

The operation is readily understood. The operator has only to grasp the shank 2 and compress the tongue 7 when the bale 5 may either be inserted into or removed from the resulting passage between the extremity of the tongue and the nose 18. The application of the hook to a bale can be accomplished by simply striking the tongue against the bale with sufficient force to unseat the tongue and let the bale ride in.

Removal of the tongue 7 becomes necessary at times. The unscrewing of the nut 9 permits the removal of the bolt 8. A screw driver is used to push the spring 14 back far enough to unseat it from the lug 15. The spring can then be slid out of the passageway 12. The tongue is removed by sliding the heel 13 sufficiently far into the housing 6 to permit the free extremity to pass the nose 18.

Replacement of the tongue is as easy and the operations occur in the reverse order. After having mounted the heel 13 upon the pivot bolt 8 the spring 14 is readily slid upon the sloping wall of the recess 17 into position upon the lug 16. A screw driver may be used to compress the spring and fit the outer end upon the lug 15. The enclosure of the upper portion of the housing 6 prevents access of foreign matter to the pivotal mounting of the tongue 7 to a large extent. The protection of the pivotal mounting is vital to the proper operation of the hook, and the practical closed housing affords it. There is little danger of injuring the spring 14. A function of the stop 20 is to prevent undue compression of the spring.

While the construction and arrangement of the improved safety snap hook is that of a generally preferred form, obviously modifications and changes may be made without departing from the spirit of the invention, or the scope of the claims.

We claim:—

1. A hook having a nose and a shank, a tongue engageable with the nose, a heel being part of the tongue and having a recess, a housing on the shank receiving the heel, a pivotal mounting for the heel within the housing, and a spring seated between the recess and a portion of the housing.

2. A hook having a nose and a shank, a housing comprising sides, a top and a front carried by the shank, providing a partial enclosure, a tongue engageable with the nose having a heel inserted between said sides beneath the top and front, a pivotal mounting for the heel within said housing, and a spring seated between the heel and the front of the housing.

3. A hook having a nose and a shank, a tongue engageable with the nose and having a heel with a recess including a sloping wall and a lug at the base of the recess, side, top and front enclosures defining a housing receiving the heel, a pivotal mounting for the heel within the housing, and a spring which is insertible in said passageway to be seated upon the confronting lug, and removable therethrough prior to disassembling the heel from the housing.

4. A hook having a shank and a nose, a tongue engageable at one end with the nose, a heel on the other end of the tongue having a recess and a stop, a spring engaging the heel in the recess, and a housing within which the heel is pivoted, forming an abutment for both the spring and stop.

Signed at Carterville, in the county of Jasper and State of Missouri this 18 day of Jan. A. D. 1928.

OTIS R. CLOSE.
ROY N. CLOSE